UNITED STATES PATENT OFFICE.

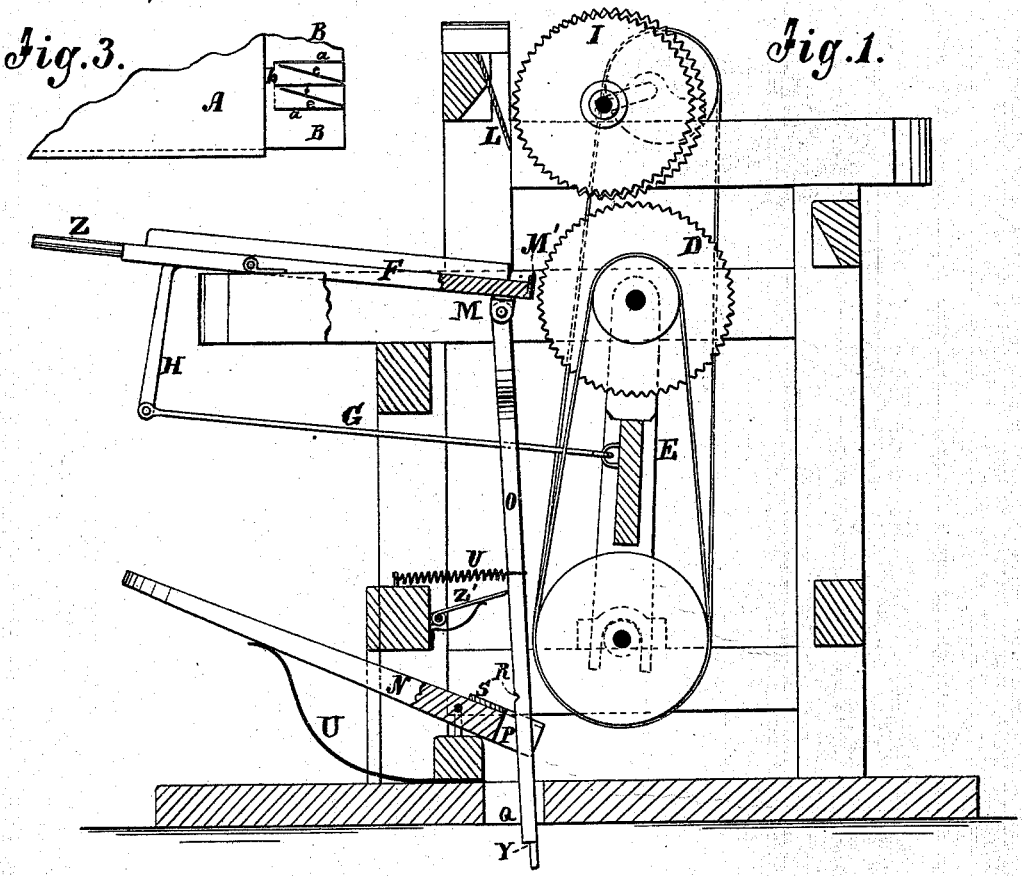

WESLEY J. HOSKINS AND AMOS D. ROWE, OF ESSEX, NEW YORK.

IMPROVEMENT IN RELISHERS AND WEDGE-CUTTERS.

Specification forming part of Letters Patent No. 139,715, dated June 10, 1873; application filed May 17, 1873.

*To all whom it may concern:*

Be it known that we, WESLEY J. HOSKINS and AMOS D. ROWE, of Essex, in the county of Essex and State of New York, have invented a new and Improved Relisher and Wedge-Cutter, of which the following is a specification:

This invention consists of a combination of instrumentalities whereby the "relish" of a door-rail may be cut, and the part to be removed may first be cut into wedges and then removed by a succession of operations, all of which are performed with one machine in a very simple, efficient, and expeditious manner, as hereinafter described.

Figure 1 is a sectional elevation of the improved machine taken on the line $x\ x$, Fig. 2. Fig. 2 is a plan view; and Fig. 3 is a portion of a door-rail, showing the relish and the wedges to be formed out of it.

A represents the door-rail, which has been rabbeted at B to form two tenons by cutting out the relish on the lines $a\ b$. The common way of cutting out this relish is to saw the lines $a$ by a couple of saws and then cut out the piece on the line $b$ with a chisel and mallet. The relish thus cut out is then sawed up into wedges, as indicated by the lines $e\ f$, to make wedges for wedging the tenons B.

Now, we propose to cut out this relish and make wedges of it by a machine as aforesaid, and therefore arrange the gang of three saws, D, for cutting the three parallel slits on the swinging frame B, which we connect to the tilting table F by the rod G and arm H, and over the saws D we mount the two saws I, for cutting the diagonal slots $e$ on an arbor, J, diagonal to the arbor of saws D. In front of these we arrange the stationary cutters L, for cutting out the relish on the line $b$. On the inner end of the table we have a strap, M, and we connect this end to the rod O, which extends down through the slot P, in the end of a foot-treadle, N, also through a hole, Q, in the platform. This rod has a notch, R, with which the edge of a plate, S, on the foot-treadle engages and supports the table in the right position in front of saws D. The rod is held on the plate by the spring U.

In the first place the rail is put on the table and moved along one of the guides W, properly adjusted therefor against the saws D, till the shoulder of the rabbet comes against stop M', by which the saws cut the slits $a\ f;$ then the table is tilted upward by handle Z, without moving the rail from its position on the table, to the saws I, which make the diagonal cuts C; from the saws the work is moved up to the cutters above; then the treadle on which the rod O now rests by the shoulder Y is forced up and the wedges are cut off, leaving the relish, and making the wedges complete. The other guide is intended for the second or bottom relish on the same end of the rail, which is to be operated as above. The lower saws D swing back to give the wedges space to drop without coming in contact with them. The pawl Z' throws the rod O off from the foot-treadle N, when it is let down again.

Having thus described our invention, we claim as new and desire to secure by Letters Patent—

1. The combination of the gangs of saws D I, oscillating table F, and stationary cutters L, substantially in the manner described.

2. The swinging saw-frame E and oscillating table F, connected by arm H and rod G, substantially as specified.

3. The combination of rod O, treadle N, spring U, and pawl Z', substantially as herein described.

WESLEY J. HOSKINS.
AMOS D. ROWE.

Witnesses:
HENRY E. HOSKINS,
A. J. TUCKER.